United States Patent [19]
Lusa

[11] Patent Number: 4,745,992
[45] Date of Patent: May 24, 1988

[54] BRAKE SHOE ASSEMBLY RETAINER AND LINING WEAR SENSOR

[75] Inventor: George Lusa, Dayton, Ohio

[73] Assignee: General Motors Corporation, Detroit, Mich.

[21] Appl. No.: 57,357

[22] Filed: May 29, 1987

[51] Int. Cl.$^4$ .................... F16D 66/02; F16D 55/224
[52] U.S. Cl. ................... 188/1.11; 188/73.31
[58] Field of Search ............... 188/1.11, 73.1, 73.31, 188/73.36, 73.37, 73.38, 250 E, 250 F; 192/30 V, 30 W; 116/208; D12/180

[56] References Cited

U.S. PATENT DOCUMENTS 4,342,380   8/1982   Melinat .................... 188/73.31 X

FOREIGN PATENT DOCUMENTS 0090134   7/1981   Japan ..................... 188/1.11
1161355   8/1969   United Kingdom ............ 188/73.31

Primary Examiner—Andres Kashnikow
Assistant Examiner—Robert J. Oberleitner
Attorney, Agent, or Firm—D. D. McGraw

[57] ABSTRACT

A disc brake assembly having a spring retainer holding the inner brake shoe assembly to the brake piston and also having a brake lining wear sensor formed as a part of the spring retainer which will engage the rotating disc of the assembly and generate an audible wear warning signal when the brake is actuated and the brake lining of the brake shoe assembly is worn sufficiently to permit such engagement.

6 Claims, 1 Drawing Sheet

BRAKE SHOE ASSEMBLY RETAINER AND LINING WEAR SENSOR

The invention relates to a combined brake shoe assembly retainer and lining wear sensor for use in a disc brake having a brake shoe assembly and a cup-shaped piston for moving the brake shoe assembly into and out of engagement with a rotatable disc to be braked. The brake shoe assembly includes a backing plate having a friction lining on one side for braking engagement with the disc. The piston has an inner wall, a closed end and an annular end, the annular end engaging the other side of the backing plate. A boss is also formed on the side of the backing plate engaged by the piston so that it extends slightly into the piston.

It has been common for some years to provide lining warning wear sensors on a brake shoe, whether in drum brakes or disc brakes. A common sensor in use is one which is secured to one end of a disc brake backing plate and has an arm or tab extending adjacent the shoe end so that it engages the disc being braked when the lining has sufficiently worn in the area of the sensor. The sensor, in rubbing against the disc during braking, generates an audible signal which provides a warning to the vehicle operator that the lining is worn and that lining replacement is required. Brake shoe assemblies have also been retained in cup-shaped pistons by a spring-like configuration which extends into the open end of the cup-shaped piston, placing a retention force thereon so that the brake shoe assembly is retained in position on the end of the piston.

The invention herein disclosed and claimed comprises a spring body having a main body section. A center opening is provided in the main body for receiving the backing plate boss. The opening also has suitable means such as tabs which are arranged to grip the boss and secure the spring body to the backing plate. One spring body end has a retainer section formed as a part thereof by a reversely bent extension of the spring body main body section. The retainer section terminates in a free end which will engage the inner wall of the piston adjacent the piston annular end and retain the brake shoe assembly to or in position relative to the piston. The other end of the spring body has a friction lining wear sensing tab formed therefrom. This tab extends outwardly from the main body section so as to extend beyond the backing plate and a portion of the friction lining adjacent the backing plate, the extension being toward the disc being braked when the retainer and sensor is installed in the brake assembly. The thickness of the portion of the friction lining to which the tab extends is the thickness to which the lining may be worn after which the wear sensor should be activated to generate a lining wear signal. The outer end of this tab will engage the disc being braked as the disc rotates during brake actuation. This will vibrate the tab and at least a part of the spring body main body section so as to generate the audible warning signal. The spring body of the retainer and sensor is preferably formed from flat sheet spring stock. The sensor tab extends through an opening formed in the backing plate and the at times also in friction lining. The tab terminates at the desired thickness of the friction lining. The opening may be a recess on the upper side of the brake shoe assembly, or may be an opening extending through the backing plate and at least a portion of the friction lining material. The wear sensor tab is a generally right angle extension of the main body section of the retainer and sensor. It may be located in a plane which is substantially parallel to the planar free end of the retainer section so that the tab outer end is arranged to be in alignment with an arc segment of the disc. Alternatively, it may be in a plane which is substantially perpendicular to the planar free end of the retainer section so that the tab outer end is arranged to be in alignment with a radial segment of the disc. This arrangement provides a simplified retainer and sensor having fewer parts than heretofore, requiring only one fastening arrangement which may be one of the type wherein the retainer and sensor body is merely pushed over a boss so that it grips the boss.

IN THE DRAWING

Figure 1:
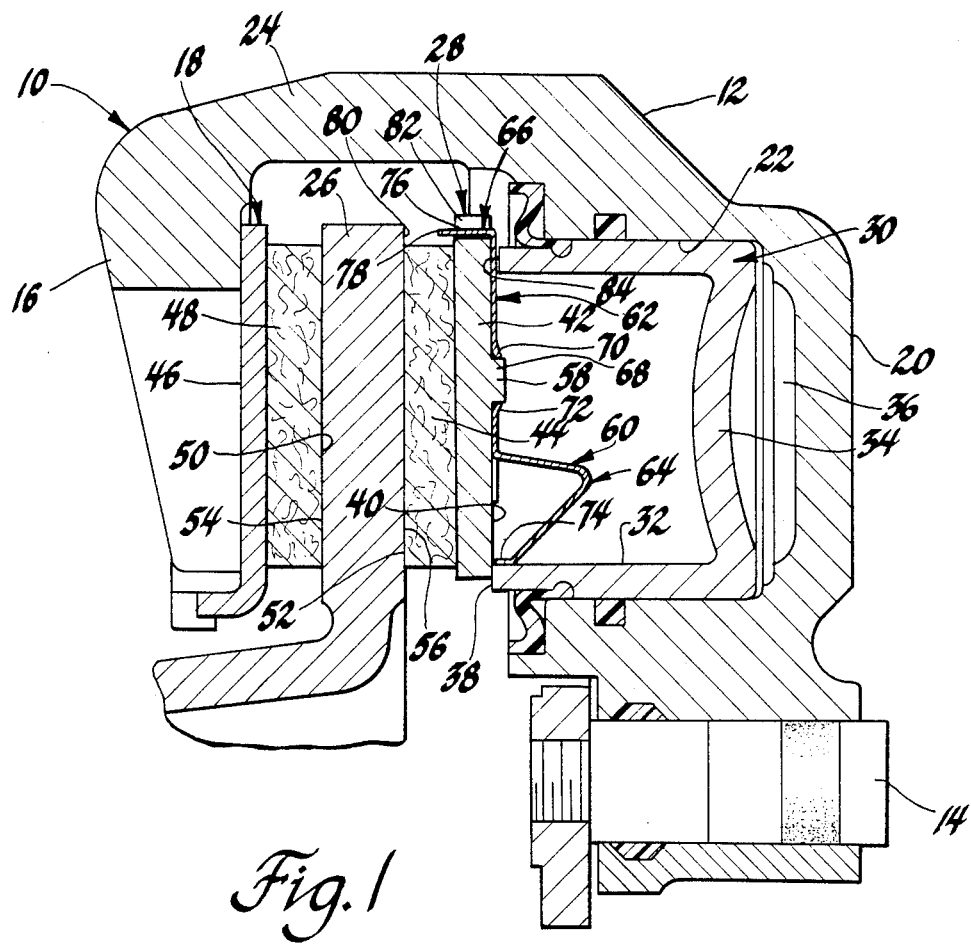
FIG. 1 is a cross-section view with parts broken away illustrating a disc brake assembly having the invention embodied therein.

The disc brake assembly 10 is illustrated as being a typical sliding caliper disc brake assembly. The caliper 12 is slidably mounted on support bolt means 14 and includes an outer leg 16 on which the outer brake shoe assembly 18 is mounted, an inner leg 20 in which a piston chamber 22 is formed, and a caliper housing bridge 24 joining legs 16 and 20. The disc 26 to be braked has the friction braking portion thereof received between legs 16 and 20 and adapted to be engaged by the outer brake shoe assembly 18 and the inner brake shoe assembly 28 for braking action when the brake assembly is actuated, as is well known in the art. Piston 30 is sealingly and reciprocably received in chamber 22. Piston 30 is generally cup-shaped with a cylindrical inner wall 32 defining the hollow portion of the piston and an end wall 34 on which hydraulic pressure acts in the pressurizing chamber 36 to actuate the brake assembly. The annular outer end 38 of piston 30 is arranged to engage one side 40 of the backing plate 42 of brake shoe assembly 28. The other side of backing plate 42 has friction material 44 secured thereto and forming a brake lining. The outer brake shoe assembly 18 is also constructed with a backing plate 46 to which the brake lining 48 is secured. Brake linings 44 and 48 respectively have friction braking surfaces 50 and 52 which are positioned to engage the opposed friction braking surfaces 54 and 56 of disc 26 in braking relation when the brake is actuated. The side of backing plate 42 facing the interior of piston 30 is provided with a boss 58 extending therefrom toward the interior of the piston. This boss provides a mounting arrangement for the retainer and sensor mechanism further described below.

The brake shoe assembly retainer and lining wear sensor mechanism 60 is a spring body, preferably made from flat spring stock, having a main body section 62, a retainer section 64, and a wear sensing section 66. The main body section 62 has an opening 68 formed therethrough. Gripping tabs 70 and 72 define portions of opening 68 so that when the member 60 is installed on the backing plate 42, boss 58 is received through the opening 68 and the tabs 70 and 72 grip the sides of the boss and hold the member 60 on the backing plate. The main body section 62 of member 60 is preferably flat so that it lies in surface engagement with the side 40 of backing plate 42.

The retainer section 64 is a reversely bent spring acting section bent from an extended end portion of the spring body defining member 60 so that the retainer section 64 extends into the piston 30 and has a spring end 74 terminating substantially in the plane of the main body section 62 but spaced therefrom and also perpendicular thereto so that spring end 74 engages the piston inner wall 32 at the side thereof away from the caliper bridge 24 and toward the rotational axis of disc 26. Thus the retainer section 64 supports the inner brake shoe assembly 28 in a radially outward position and prevents that shoe assembly from falling out of the caliper housing when the brakes are released. To that extent it therefore retains the brake shoe assembly 28 in position as a part of the disc brake assembly 10.

The other end of the spring body member 60 is formed to define the wear sensing section 66. This section includes a friction lining wear sensing tab 76 formed therefrom by being bent outwardly at a right angle. Therefore tab 76 is effectively a right angle extension of the main body section 62. In the arrangement illustrated in FIGS. 1 and 2, tab 76 is in a plane which is substantially parallel to the planar free end 74 of the retainer section 64 so that the tab outer end 78 is in alignment with an arc segment of the disc friction surface 56, or a radially outward extension thereof, identified as surface section 80.

Figure 2:
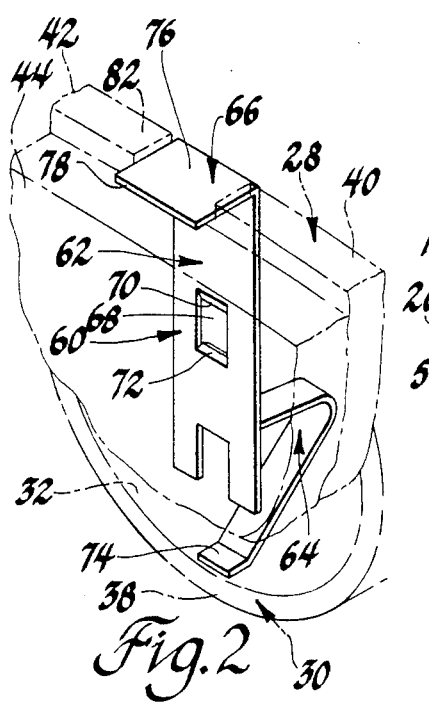
FIG. 2 is a perspective view of the retainer and sensor of FIG. 1 with portions of the piston and brake shoe assembly being shown in phantom.

Tab 76 is illustrated in FIGS. 1 and 2 as being positioned outwardly of the brake lining 44 and on the outer side of the backing plate 42. As more particularly illustrated in FIG. 2, tab 76 may extend through an opening 82 formed in the backing plate 42. If appropriate and if the brake lining material 44 extends sufficiently far radially outward in relation to the disc, a suitable extension of opening 82 may be provided in the lining material. As illustrated in FIG. 2 the opening 82 is a groove or channel rather than a circular or other closed wall opening. The tab outer end 78 terminates beyond the entire thickness of the backing plate and at a portion of the thickness of friction lining 44 adjacent the backing plate, the thickness of the portion of the friction lining over or through which the tab 76 extends being the thickness that the lining should have remaining when the wear sensor should be activated. Thus, as seen in FIG. 1, the amount of friction material 44 which may be worn during brake actuation before the lining wear sensor is activated is the material thickness between the planes of the outer end 78 of tab 76 and the surface section 80 of the disc.

When the brake assembly is actuated and the lining is sufficiently worn, the tab outer end 78 engages the disc surface section 80 and generates an audible signal caused by the vibration of the tab 76 and a portion of the main body section 62 from boss 58 to the tab 76. In order to permit such vibration and not to have the force of the piston act directly through the main body section, a notch 84 may be provided in the piston end 38 where the main body 62 of member 60 passes beyond the piston end near tab 76. In some instances, the vibration frequency will be such as to be audible even though the piston end 38 engages the main body section 62 and therefore only a very small part thereof is subject to vibration, that part being the portion between point of engagement of with the piston end 38 with the main body section and the point where tab 76 is bent.

Figure 3:
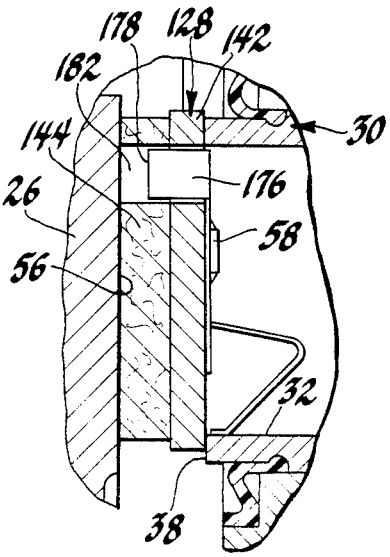
FIG. 3 is a fragmentary cross-section view similar to a portion of FIG. 1 showing a modification of the retainer and sensor and an appropriate modification of the brake shoe assembly to accommodate the modified retainer and sensor.
Figure 4:
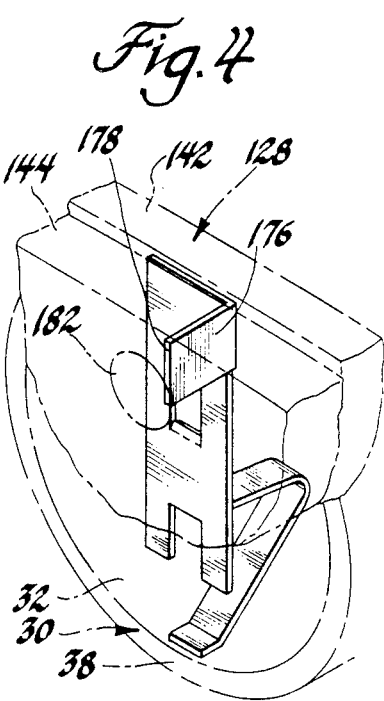
FIG. 4 is a perspective view of the modified retainer and sensor of FIG. 3 with portions of the brake shoe assembly and the caliper piston being shown in phantom.

FIGS. 3 and 4 show a modification of the brake shoe assembly retainer and lining wear sensor. In this arrangement, the main body section and the retainer section are constructed as before, but tab 176 is bent from a side extension of the main body section so that it lies in a plane which is substantially perpendicular to the planar free end of the retainer section, positioning the tab outer end 178 so that it is in alignment with a radial segment of the disc rather than an arc segment thereof. Also, a passage forming an opening 182 through the backing plate 142 and at least a portion of the friction lining 144 of the inner brake shoe assembly 128, receives the tab 176 therethrough. The tab outer end 178 extends through the desired thickness of the friction lining 144 which must remain when the rest of the friction lining is worn away to decrease the thickness of the friction lining to that value. When the lining has so been worn away, the tab end 178 engages the friction surface 56 of the disc and generates an audible lining wear warning signal as before.

The embodiments of the invention in which an exclusive property or privilege is claimed are defined as follows:

1. For use in a disc brake having a brake shoe assembly and a cup-shaped piston for moving the brake shoe assembly into and out of engagement with a rotatable disc to be braked, the brake shoe assembly including a backing plate having a friction lining on one side for braking engagement with the disc, the piston having an inner wall and an annular end engaging the other side of the backing plate, the other side of the backing plate having a boss formed thereon extending into the piston, a combined brake shoe assembly retainer and lining wear sensor comprising:

a spring body having a main body section provided with a center opening for receiving the backing plate boss and provided with means for gripping the boss and securing said spring body to the backing plate, one spring body end having a retainer section formed by a reversely bent extension of said spring body main body section and terminating in a free end adapted to engage the inner wall of the piston adjacent the piston annular end and retain the brake shoe assembly to the piston, and the opposite end of said spring body having a friction lining wear sensing tab formed therefrom, said tab extending outwardly from said main body section and adapted to extend beyond the backing plate and a portion of the friction lining adjacent the backing plate of a thickness which when the lining has been worn to that thickness the wear sensor should be activated, said tab having its outer end adapted to engage the disc during brake actuation when the friction lining has worn to that thickness where the wear sensor should be activated and to vibrate said tab and at least a part of said spring body main body section and generate an audible warning signal indicating that sufficient lining wear has occurred to require such warning.

2. For use in a disc brake having a brake shoe assembly and a cup-shaped piston for moving the brake shoe assembly into and out of engagement with a rotatable disc to be braked, the brake shoe assembly including a backing plate having a friction lining on one side having a friction braking surface for braking engagement with the disc, the piston having an inner wall and an annular end engaging the other side of the backing plate, the other side of the backing plate having a boss formed thereon extending into the piston, a combined brake shoe assembly retainer and lining wear sensor comprising:

a flat sheet stock spring body having a main body section provided with a center opening for receiving the backing plate boss and provided with means for gripping the boss and securing said spring body to the backing plate, one spring body end having a retainer section formed by a reversely bent extension of said spring body main body section and terminating in a planar free end adapted to engage the inner wall of the piston adjacent the piston annular end and retain the brake shoe assembly to the piston, and the opposite end of said spring body having a friction lining wear sensing tab formed therefrom, said tab extending outwardly from said main body section and adapted to extend through an opening formed in the backing plate and the friction lining and terminate beyond the backing plate and a portion of the friction lining adjacent the backing plate of a thickness which when the lining has been worn to that thickness the wear sensor should be activated, said tab having its outer end adapted to engage the disc during brake actuation when the friction lining has worn to that thickness where the wear sensor should be activated and to vibrate said tab and at least a part of said spring body main body section and generate an audible warning signal indicating that sufficient lining wear has occurred to require, such warning.

3. The combined brake shoe assembly retainer and lining wear sensor of claim 2 in which said lining wear sensor tab is adapted to extend through the friction braking surface of the friction lining to engage the disc when the wear sensor is to be activated.

4. The combined brake shoe assembly retainer and lining wear sensor of claim 2 in which said lining wear sensor tab is adapted to be positioned laterally beyond the friction braking surface of the friction lining to engage the disc when the wear sensor is to be activated.

5. The combined brake shoe assembly retainer and lining wear sensor of claim 2 in which said lining wear sensor tab is a generally right angle extension of said main body section and in a plane substantially parallel to said planar free end of said retainer section so that said tab outer end is adapted to be in alignment with an arc segment of the disc.

6. The combined brake shoe assembly retainer and lining wear sensor of claim 2 in which said lining wear sensor tab is a generally right angle extension of said main body section and in a plane substantially perpendicular to said planar free end of said retainer section so that said tab outer end is adapted to be in alignment with a radial segment of the disc.

* * * * *